Aug. 13, 1957 E. E. MADION 2,802,395
MIRROR SUPPORT STRUCTURE
Filed Oct. 20, 1954
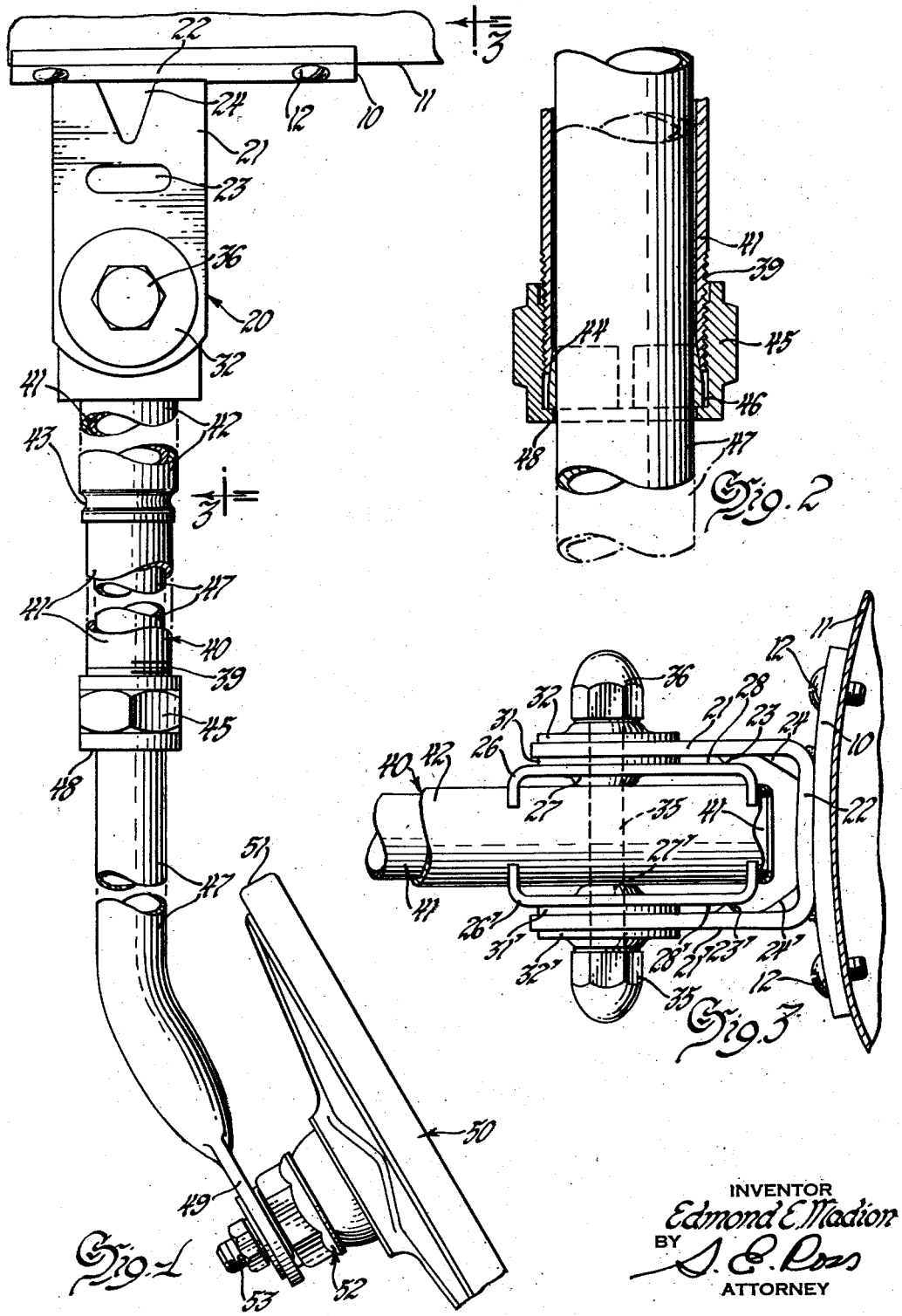
INVENTOR
Edmond E. Madion
BY
J. E. Ross
ATTORNEY

United States Patent Office 2,802,395
Patented Aug. 13, 1957

2,802,395

MIRROR SUPPORT STRUCTURE

Edmond E. Madion, Detroit, Mich., assignor to General Motors Corporation, Detroit, Mich., a corporation of Delaware Application October 20, 1954, Serial No. 463,564

4 Claims. (Cl. 88—98)

This invention relates to support arm structures for rear view mirrors and the like for use on motor vehicles. More particularly, the invention relates to an improved bracket assembly and arm structure.

Extensible support arms find extensive use on truck vehicles for supporting rear view mirrors at a position somewhat beyond the outer extremity of the truck body. This, of course, is necessary to afford the operator a suitable field of vision to the rear. It is desirable that the arm length be adjustable and that the arm be movable about its point of support to permit initial adjustment for normal use and to permit retraction in situations where clearance is limited. However, in normal use the mirror is in a vulnerable position and it frequently occurs that the mirror accidentally strikes an object because of its protrusion beyond the vehicle body. This subjects the bracket assembly and the arm adjacent the point of support to severe stress resulting in breakage or other damage to the arm. Thus, it is desirable to provide an arm and support structure which is capable of yielding under the influence of a force which would cause damage to the device.

Accordingly, it is an object of this invention to provide an improved arm structure and bracket assembly which permits initial adjustment and which insures that the device will not be damaged by the application of excessive force.

It is a further object of this invention to provide an improved bracket assembly for a cylindrical support arm capable of yielding under the influence of an excessive force applied to the arm.

It is another object to provide a rear view mirror support structure which permits extension of the arm, initial angular adjustment at the support bracket, and yielding motion to prevent breakage.

It is another object to provide a bracket assembly permitting reinforcement of a cylindrical arm and which permits yielding motion to avoid damage.

A further object is to provide a bracket assembly and tubular support arm for an extensible arm rear view mirror which is unusually resistant to displacement by vibration and road shock, and which is yieldable against frictional constraint to prevent damage by an excessive force.

These and other objects of the invention and the manner in which they are achieved will become apparent from the description which follows taken with the accompanying drawings in which:

Figure 1 is a plan view of the assembly.

Figure 2 is a sectional view of a telescoping arm joint.

Figure 3 is an elevational view of the bracket assembly and a portion of the arm structure.

Briefly, this invention resides in a bracket assembly comprising spaced support members and interposed retainer members for supporting an arm. The arm and retainer members are pivotally mounted on the support members and one member is provided with a projection which frictionally engages the surface of the other member to constrain the members against relative motion. Tubular reinforcement of the arm is permitted by the construction of the retainer and support members.

Referring now to the drawings, there is shown an exemplary embodiment of the inventive device in an extensible arm rear view mirror assembly. In Figure 1 the entire supporting assembly is shown comprising a mounting plate 10 to which is secured a bracket assembly, designated generally at 20, for supporting a generally cylindrical arm structure, designated in its entirety at 40, upon which is mounted the mirror assembly 50.

The mounting plate 10 is of suitable configuration to conform to the mounting portion of the vehicle body, such as the cowl 11. The plate 10 is secured to the cowl by any suitable fastening devices such as bolts or self-tapping screws 12.

The bracket assembly, designated generally at 20, comprises support members or plates 21 and 21' extending from base portion 22 forming a generally U-shaped structure. The base portion is secured to the mounting plate 10 by any suitable means such as by spot welding. This structure is of such shape and construction that it may be formed by a stamping operation to provide the oppositely disposed elongated projections 23 and 23' on the support members 21 and 21'. Reinforcing diagonal ribs 24 and 24' are provided at the junctures between the base portion 22 and the support members 21 and 21'.

The bracket assembly 20 also comprises retainer members or plates 26 and 26'. The retainer member 26 provided with boss 27 is disposed adjacent support member 21 and has a substantially plane surface 28 in engagement with projection 23. Similarly, a retainer member 26' provided with boss 27' is disposed adjacent support member 21' and has a substantially plane surface 28' in engagement with projection 23'. Each end of the retainer members 26 and 26' extends inwardly and the extremity thereof is of arcuate shape to conform to the contour of reinforcing sleeve 42 to prevent relative rotation therebetween. Interposed between the support member 21 and retainer member 26 is a washer 31. Similarly, between support member 21' and retainer member 26' is washer 31'. The washers are of a thickness corresponding to the height of the projections 23 and 23' and are of a material which is somewhat compressible, such as fiber, for reasons which will become apparent subsequently. Washer 32 is disposed on support member 21 opposite washer 31 and washer 32' is disposed on support member 21' opposite washer 31'.

The reinforcing sleeve 42 of the armstructure 40 is positioned between the spaced retainer members 26 and 26' and is engaged by the arcuate shaped end portions thereof and the bosses 27 and 27'. Thus, support is provided at plural points on both sides of the reinforcing sleeve 42. The parts of the bracket assembly 20, including support members 21 and 21', retainer members 26 and 26', and washers 31, 31', 32, and 32' together with reinforcing sleeve 42 and tubular member 41 are secured together by a headed-bolt or pivot pin 35 extending therethrough at a point spaced from the base portion 22. A threaded nut 36 is provided on the shank of bolt 35. The headed-bolt 35 and nut 36 constitute securing means for the bracket assembly to clamp the support members 21 and 21' and the retainer members 26 and 26' together against the reaction of the reinforcing sleeve 42. The bolt 35 also serves as a pivot pin for the assembly as will appear hereinafter.

The arm structure, designated in its entirety at 40, comprises tubular member 41 having one end portion within coaxial reinforcing sleeve 42 and disposed between the retainer members 26 and 26'. Reinforcing sleeve 42 is suitably fixed to the tubular member 41 by a swaging operation forming an annular groove 43. The other end of the tubular member 41 terminates in an externally threaded portion 39 and at the extremity thereof, the inner periphery is provided with an axially tapered seat 44. An extension member 47 is slidably disposed within the tubular member 41 and supported on its outer surface is a split bushing 46, having one end axially tapered for mating engagement with the tapered seat 44. A locking nut 45 threadedly engages the tubular member 41 and is provided with an inwardly extending annular flange 48. The flange 48 engages the bushing 46 and when the nut 45 is tightened the flange urges the tapered surface of the bushing against the tapered seat 44 tending to compress the split bushing. This serves to lock the extension member 47 in fixed relation to the tubular member 41.

The outer end of the extension member 47 may be bent at a desired angle and terminates in a flat portion 49 for mounting of the mirror assembly 50. The mirror assembly 50 includes a housing 51 supporting a mirror (not shown). The mirror assembly is pivotally mounted on extension member 47 by cup member 52 and ball stud 53.

In operation of the inventive device, the nut 36 is loosened to permit angular adjustment of the entire arm structure 40 about the pivot pin 35. Once the desired angle has been established the nut 36 is tightened to clamp the bracket assembly tightly against the reinforcing sleeve 42. Under the influence of the securing means, the washers 31 and 31' are compressed slightly and the projections 23 and 23' are urged into engagement with the substantially plane surfaces 28 and 28' of the retainer members 26 and 26', respectively. It will be appreciated that the amount of frictional constraint to relative motion offered by the projections and the retainer members can be adjusted by the degree to which the securing means are tightened.

It will now be apparent that once the angular position of the support arm structure is adjusted and the bracket assembly is clamped thereto, the arm and mirror assembly will be securely mounted for normal use. Because of the support offered by the retaining members at plural, spaced points, the arm and mirror assembly will be exceedingly resistant to accidental displacement by vibration or road shock. The advantages gained by utilizing the tubular reinforcing sleeve partially coextensive with the arm will now be appreciated. This arrangement permits construction from tubular stock and the use of large tubing adjacent the support bracket with smaller tubing at the outer end. The bracket assembly permits yielding of the arm structure about the pivot pin under the influence of a force which would otherwise damage the arm structure. Rotational movement is frictionally constrained by the engagement of the projections on the support members with the plane surfaces of the retainer members.

Although the invention has been described with respect to a particular embodiment, such description is not to be construed in a limiting sense. Numerous modifications and variations within the spirit and scope of the invention will now occur to those skilled in the art. For a definition of the invention reference is made to the appended claims.

I claim:

1. A mirror assembly supporting structure comprising a generally U-shaped member adapted to be supported from its base portion and having integral projections oppositely disposed on the side portions thereof, a cylindrical arm disposed between said side portions and extending outwardly from said base portion, oppositely disposed retainer members non-rotatably mounted on said arm adjacent said side portions, a compressible washer interposed between each side portion and the adjacent retainer member, the washers having a thickness corresponding to the height of said projections, a pivot pin extending through said side portions, said retainer members, said washers, and said arm permitting rotative positioning of said arm about the pivot pin; said projections being frictionally engageable with the surface of the adjacent retaining member, and clamping means on said pivot pin for adjusting the frictional engagement of said projections and said retaining means.

2. A mirror assembly mounting structure permitting tubular reinforcement of a cylindrical arm structure comprising a pair of spaced support members, a cylindrical arm including a coaxial tubular reinforcing sleeve adjacent one of its ends with its other end extending outwardly from said support members, a retainer member non-rotatably mounted on said sleeve between said support members, a pivot pin extending through said arm and each of said support members permitting rotative positioning of said arm, one of said support and retainer members having a substantially plane surface, the other of said support and retainer members being provided with a projection for frictional engagement with said surface, and means for clamping said support and retainer members together to provide yieldable engagement between the projection and the plane surface.

3. A mirror assembly mounting structure permitting tubular reinforcement of a cylindrical support arm comprising a generally U-shaped member adapted to be supported from its base portion and having an inwardly extending integral projection on each side portion thereof, a cylindrical arm disposed between the side portions and extending outwardly from said base portion, a tubular reinforcing sleeve fitted on said arm between the side portions of said member, a retainer member mounted on each side of said sleeve adjacent a side portion of said member, a compressible washer member interposed between each side portion and the adjacent one of said retainer members, said washers having a thickness corresponding to the height of said projections, a pivot pin extending through the side portions, washers, retainer members, sleeve, and arm permitting rotative positioning of said arm about the pivot pin; each said projection frictionally engaging the surface of the adjacent retaining member, and clamping means for adjusting the frictional resistance between said projections and said retainer members to retain said arm in an adjusted position.

4. An extensible arm rear view mirror comprising first and second oppositely disposed support members each having an inwardly extending projection, first and second oppositely disposed retainer members between said support members each having a substantially plane surface engaging the said projection on the adjacent one of said support members, a first compressible washer between said first support and retainer members and a second compressible washer between said second support and retainer members, a tubular member provided with a coaxial reinforcing sleeve terminating at one end of said tubular member and being partially coextensive therewith, said one end of the tubular member being disposed between said retainer members, said retainer members being non-rotatably supported on said reinforcing sleeve, a pivot pin extending through the assembly of the support members, retainer members, washers, sleeve, and tubular member, securing means on said pivot pin for clamping said assembly together to adjust the frictional resistance to pivotal motion of said tubular member, an extension member coaxial at one of its ends with said tubular member and slidably mounted therein, said tubular member terminating at its other end in an axially tapered seat, a split bushing on said extension member having an axially tapered outer surface, a locking nut threadedly engaging said tubular member and having a flange engaging said bushing for urging the bushing into said seat when said nut is rotated to lock said extension member to said tubular member, and a mirror assembly mounted on the other end of said extension member.

References Cited in the file of this patent

UNITED STATES PATENTS

| | | |
|---|---|---|
| 462,663 | Chapman | Nov. 3, 1891 |
| 935,416 | Schneider | Sept. 28, 1909 |
| 1,243,031 | Barney | Oct. 16, 1917 |
| 1,893,245 | Ritz-Woller | Jan. 3, 1933 |
| 1,980,149 | Zink | Nov. 6, 1934 |
| 2,565,012 | Barrett | Aug. 21, 1951 |
| 2,642,244 | Beach | June 16, 1953 |
| 2,674,922 | Robinson | Apr. 13, 1954 |